US011474915B2

(12) United States Patent
Killadi et al.

(10) Patent No.: US 11,474,915 B2
(45) Date of Patent: Oct. 18, 2022

(54) CLUSTER RECOVERY MANAGER TO REMEDIATE FAILOVERS

(71) Applicant: Hewlett Packard Enterprise Development LP, Houston, TX (US)

(72) Inventors: Srinivas Rao Killadi, Bangalore (IN); Sree Vasthav Shatdarshanam Venkata, Bangalore (IN); Indu Shree Akasapu, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 886 days.

(21) Appl. No.: 16/114,541

(22) Filed: Aug. 28, 2018

(65) Prior Publication Data
US 2020/0073769 A1    Mar. 5, 2020

(51) Int. Cl.
  *G06F 11/20* (2006.01)
  *G06F 11/07* (2006.01)
  (Continued)

(52) U.S. Cl.
  CPC ...... *G06F 11/2023* (2013.01); *G06F 11/0709* (2013.01); *G06F 11/0793* (2013.01);
  (Continued)

(58) Field of Classification Search
  CPC .............. G06F 11/2023; G06F 11/0709; G06F 11/0793; G06F 11/1438; G06F 11/3409; G06F 2201/81; H04W 88/12
  See application file for complete search history.

(56) References Cited

U.S. PATENT DOCUMENTS

| 6,529,784 B1* | 3/2003 | Cantos | G06F 11/2294 |
| | | | 700/79 |
| 7,509,415 B2* | 3/2009 | Baekelmans | G06F 11/0709 |
| | | | 709/223 |

(Continued)

FOREIGN PATENT DOCUMENTS

| WO | WO-2004046953 A1 | 6/2004 | |
| WO | WO-2015164669 A1 * | 10/2015 | H04W 36/023 |

(Continued)

OTHER PUBLICATIONS

Kiyong Kim, Yeonseung Ryu, Jong-myung Rhee and Dong-ho Lee, "SAFE: Scalable Autonomous Fault-tolerant Ethernet," 2009 11th International Conference on Advanced Communication Technology, 2009, pp. 365-369. (Year: 2009).*

(Continued)

*Primary Examiner* — Matthew M Kim
*Assistant Examiner* — Indranil Chowdhury
(74) *Attorney, Agent, or Firm* — Brooks, Cameron & Huebsch, PLLC

(57) ABSTRACT

Example implementations relate to management of clusters. A cluster recovery manager may comprise a processing resource; and a memory resource storing machine-readable instructions to cause the processing resource to: adjust, based on a monitored degree of performance of a controller of a controller cluster, a state of the controller to one of a first state and a second state; and reassign a corresponding portion of a plurality of APs managed by the controller periodically to a different controller until the state of the controller is determined to be adjustable to the first state. The reassignment can be triggered responsive to a state adjustment of the controller from the first state to the second state.

20 Claims, 12 Drawing Sheets

(51) Int. Cl.
    *G06F 11/34*         (2006.01)
    *H04W 88/12*      (2009.01)
    *G06F 11/14*         (2006.01)

(52) U.S. Cl.
    CPC ...... *G06F 11/1438* (2013.01); *G06F 11/3409* (2013.01); *H04W 88/12* (2013.01); *G06F 2201/81* (2013.01)

(56) References Cited

U.S. PATENT DOCUMENTS

| | | | |
|---|---|---|---|
| 7,827,270 B2 * | 11/2010 | Thomson | H04W 8/12 709/223 |
| 8,055,735 B2 | 11/2011 | Krishnappa et al. | |
| 8,159,976 B2 | 4/2012 | El-Damhougy | |
| 8,830,921 B2 * | 9/2014 | Jetcheva | H04L 41/12 370/329 |
| 9,306,801 B2 * | 4/2016 | Yang | H04L 41/0846 |
| 9,348,710 B2 * | 5/2016 | Al-Wahabi | G06F 11/203 |
| 9,444,885 B2 * | 9/2016 | Ivanov | H04L 67/1008 |
| 9,817,709 B2 * | 11/2017 | Gowin | G06F 11/0793 |
| 9,973,987 B2 * | 5/2018 | Yang | H04L 47/125 |
| 10,289,441 B1 * | 5/2019 | Chopra | G06F 9/45558 |
| 10,761,951 B2 * | 9/2020 | Poornachandran | G06F 11/202 |
| 10,904,073 B2 * | 1/2021 | Killadi | H04L 41/0668 |
| 10,938,625 B2 * | 3/2021 | Shatdarshanam Venkata | H04B 1/74 |
| 2003/0055931 A1 * | 3/2003 | Cravo De Almeida | H04L 63/04 709/223 |
| 2015/0312140 A1 * | 10/2015 | Yang | H04L 12/18 370/218 |
| 2015/0312819 A1 * | 10/2015 | Yang | H04W 84/12 370/331 |
| 2015/0312820 A1 * | 10/2015 | Yang | H04W 84/12 370/331 |
| 2015/0373561 A1 * | 12/2015 | Huang | H04L 41/0823 370/252 |
| 2016/0323781 A1 * | 11/2016 | Yang | H04W 24/08 |
| 2018/0316749 A1 * | 11/2018 | Sah | G06F 9/5083 |
| 2019/0132192 A1 * | 5/2019 | Killadi | H04L 41/0668 |
| 2019/0334909 A1 * | 10/2019 | Schmitt | G06F 3/067 |
| 2020/0186599 A1 * | 6/2020 | Sah | H04L 67/1008 |

FOREIGN PATENT DOCUMENTS

| | | | | |
|---|---|---|---|---|
| WO | WO-2015164670 A1 * | 10/2015 | | H04L 12/18 |
| WO | WO-2015164671 A1 * | 10/2015 | | H04W 36/023 |
| WO | WO-2015172109 A1 * | 11/2015 | | H04W 4/06 |

OTHER PUBLICATIONS

Harald Psaier, Schahram Dustdar, "A Survey on Self-Healing Systems: Approaches and Systems," 2010, Computing Magazine, pp. 1-31 (Year: 2010).*

M. Haungs, R. Pandey and E. Barr, "Handling catastrophic failures in scalable Internet applications," 2004 International Symposium on Applications and the Internet. Proceedings., 2004, pp. 188-194 (Year: 2004).*

Mary, I.M. et al., "An Acknowledgement Based Approach for Detecting False Misbehaviour in Manets," Apr. 2015, pp. 209-215, https://iicsmc.com/docs/papers/April2015/V4I4201565.pdf

* cited by examiner

US 11,474,915 B2

CLUSTER RECOVERY MANAGER TO REMEDIATE FAILOVERS

BACKGROUND

A controller cluster can be a combination of multiple managed devices working together to provide availability to a number of client devices and provide continuity when a failover occurs. Failover can be a backup operation that switches to a standby system or network if the primary system fails or is temporarily shut down for servicing.

DETAILED DESCRIPTION

Figure 1A:
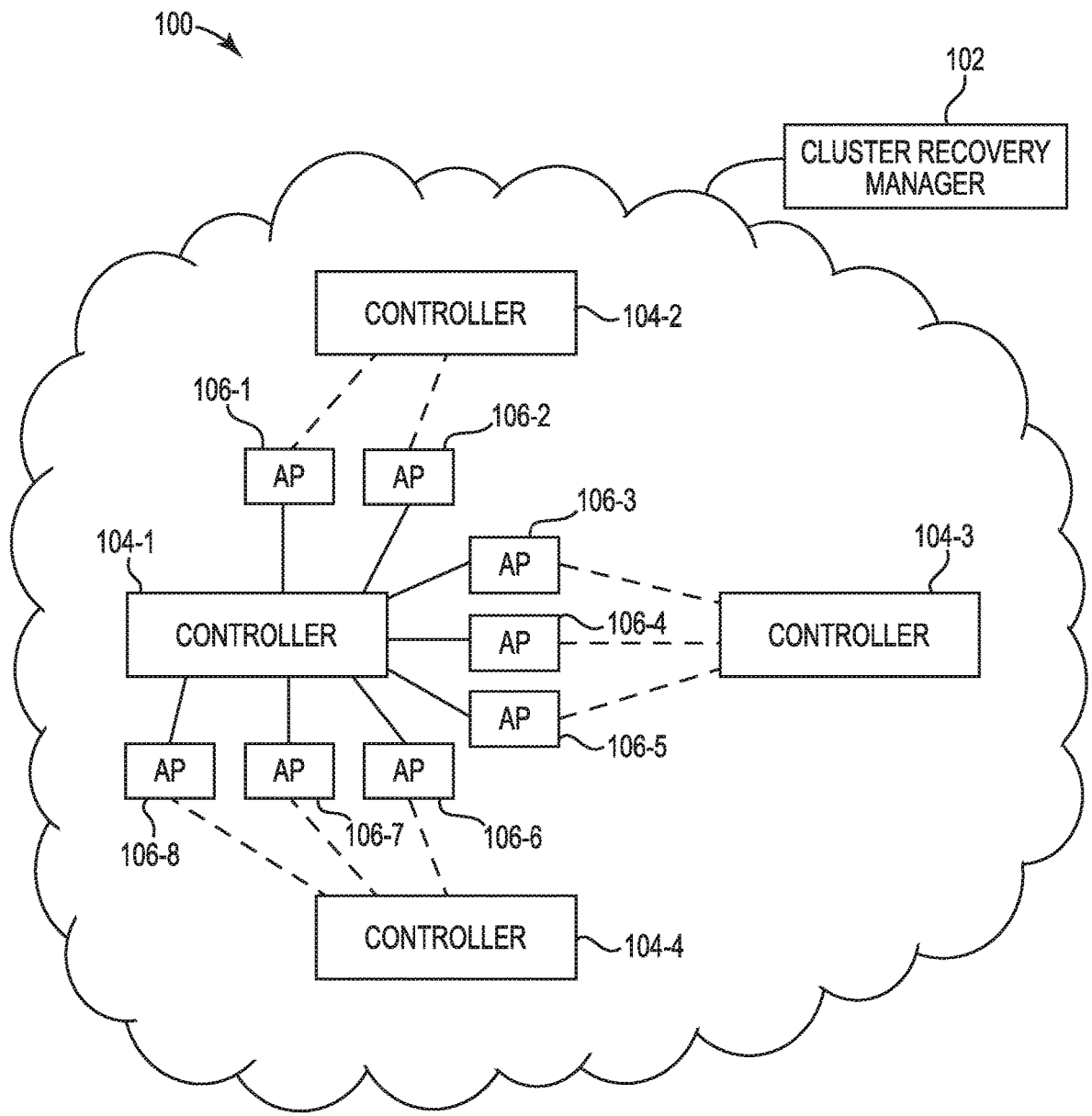
FIGS. 1A-1E illustrate an example management of clusters performed on a controller cluster by a cluster recovery manager consistent with the disclosure.

Various examples provide for a management of clusters. In an enterprise wireless local area network (WLAN) deployment, a network controller (e.g., controller hereinafter) can manage a plurality of access points (APs) as an access point anchor controller (AAC) and/or a plurality of user devices as a user anchor controller (UAC). As used herein, the term "AAC" can refer to a controller to provide, to an AP coupled to the AAC, a network connectivity. As used herein, the term "UAC" can refer to a controller that is dedicated to manage a user device. For example, the UAC can store state information of a user device, maintain/track a state of the user device, and/or handle a network traffic coming from the user device.

If a controller in a controller cluster fails, the APs and/or user devices managed by the failed controller can fail over to respective standby controllers. The failed controller may be left as a failed controller in a controller cluster, and an administrator and/or a user may be prevented from using the failed controller until a hardware/software recovery is provided to the failed controller. In previous examples, the controller cluster itself often lacks a mechanism to provide the hardware/software recovery and the recovery is manually provided by the administrator and/or user. Having the administrator and/or user involved in the recovery of the failed controller can be time consuming or subject to error.

Accordingly, the disclosure is directed to management of clusters. The management of clusters disclosed herein may provide an automatic recovery of a failed controller without alerting an administrator and/or a user. For example, a cluster recovery manager (e.g., of a controller cluster) can include a processing resource, and a memory resource storing machine-readable instructions to cause the processing resource to adjust, based on a monitored degree of performance of a controller of a controller cluster, a state of the controller from a first state to a second state. The memory resource can further store machine-readable instructions to cause the processing resource to reassign, responsive to a determination that the state of the controller is adjusted to the second state, a corresponding portion of a plurality of APs managed by the controller periodically to a different controller until the state of the controller is determined to be adjustable from the second state to the first state.

As used herein, an AP can refer to a networking device that allows a client device to connect to a wired or wireless network. The term "AP" can, for example, refer to receiving points for any known or convenient wireless access technology which may later become known. Specifically, the term AP is not limited to Institute of Electrical and Electronic Engineers (IEEE) 802.11-based APs. APs generally function as an electronic device to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

An AP may provide access to a wireless network, such as a Wireless Local Area Network (WLAN). As used herein, the term "WLAN" can, for example, refer to a communications network that links two or more devices using a wireless distribution method (for example, spread-spectrum or orthogonal frequency-division multiplexing radio), and usually providing a connection through an AP to the Internet; and thus, providing users with the mobility to move around within a local coverage area and still stay connected to the network.

FIGS. 1A-1E illustrate an example management of clusters performed on a controller cluster 100 by a cluster recovery manager 102 consistent with the disclosure. As illustrated in FIGS. 1A-1E, the controller cluster can include a cluster recovery manager 102, controllers 104-1, 104-2, 104-3, and 104-4 (e.g., collectively referred to as controllers 104), and APs 106-1, 106-2, 106-3, 106-4, 106-5, 106-6, 106-7, and 106-8 (e.g., collectively referred to as APs 106) that are connected to respective controllers 104.

In some examples, at least a portion of the APs 106 can be assigned an active controller and/or a standby controller. As used herein, the term "active controller" can, for example, refer to a controller that manages a set of APs in a network such that the controller can provide network connectivity to client devices associated with the APs. As used herein, the term "standby controller" can, for example, refer to a controller to which the APs can be reassigned from the active controller such that the standby controller can provide, in replacement of the active controller, network connectivity to client devices associated with the APs.

The APs can be reassigned to the standby controller responsive to an occurrence of a particular event, such as a decreased degree of performance of the active controller and/or a failure of the active controller. The reassignment that is performed responsive to the occurrence of the particular event (e.g., failure) can be referred to as a "failover."

In some examples, reassignments (e.g., reassignments of controllers, APs, and/or user devices) can be performed via updating a cluster table that stores information associated with how components (e.g., user devices, APs, and/or controllers) of the controller cluster are connected to each other. For example, reassigning APs and/or user devices may include updating the information stored in the cluster table to reflect changes within connections among the components of the controller cluster. The cluster table can be stored in one of controllers (e.g., controllers 104) that takes a leader position for the controllers. The leader controller can distribute, to other controllers of the controller cluster, updates and/or changes to the information stored on the cluster table such that all of the controllers of the controller cluster operates based on the same information. The leader controller can also store instructions (e.g., centralized image upgrade) received from a centralized monitoring/management agent (e.g., agent including the cluster recovery manager 102). The information associated with the cluster table and/or instructions received from the cluster recovery manager can be distributed to other controllers of the controller cluster by the agent, and/or the other controllers can access the information and/or instructions stored in the leader controller for data synchronization. In some examples, another controller may be assigned as a leader controller responsive to a failure of the previous leader controller.

As illustrated in FIG. 1A, the controller 104-1 can be assigned to APs 106 as an active controller, the controller 104-2 can be assigned to APs 106-1 and 106-2 (e.g., shown as dotted lines) as a standby controller, the controller 104-3 can be assigned to APs 106-3, 106-4, and 106-5 as a standby controller, and the controller 104-4 can be assigned to APs 106-6, 106-7, and 106-8 as a standby controller. FIG. 1A is an illustrative example showing APs that are connected to the controller 104-1; however, other APs may also connect to the controllers 104-2, 104-3, and 104-4 (although not shown in FIGS. 1A-1E) such that each of the controllers 104-2, 104-3, and 104-4 can also manage, while being a standby controller to the APs 106, the other APs as an active controller. Although examples are not so limited, the controllers 104 may be an access point anchor controller (AAC) that provides a network connectivity to respective APs 106.

The cluster recovery manager 102 can provide a management for the controller cluster 100. As a part of the management, the cluster recovery manager 102 can monitor a degree of performance of each of the controllers 104. For example, the cluster recovery manager 102 can collect information of each of the controllers 104 and determine whether a degree of performance of a particular one of the controllers 104 is below a threshold degree. In response to a determination that the degree of the performance is below the threshold degree, the cluster recovery manager 102 can, in some examples, determine that the particular one of the controllers 104 has failed. The information utilized to monitor a degree of performance of each of the controllers 104 can include, for example, a load on a central processing unit (CPU) of each of the controllers 104, a memory consumption on each of the controllers 104, frame drops, encryption/decryption failures, global shared memory (GSM) event ring drops, and/or heartbeat message misses, among others. The information can be periodically and/or triggered (e.g., responsive to a request from a respective controller and/or an occurrence of a particular event) to be collected from respective controllers.

As a part of the management, the cluster recovery manager 102 can also adjust, based on the monitored degree of performance, a state of each of the controllers 104 to one of different states. For example, when the cluster recovery manager 102 determines that a monitored degree of performance of a particular one of the controllers 104 is below a threshold degree, the cluster recovery manager 102 can adjust a state of the controller 104 from a first state to a second state, which can indicate that the particular one of the controllers 104 has failed. Similarly, when the cluster recovery manager 102 determines that a monitored degree of performance of the controller 104, which used to be below a threshold degree, meets or exceeded the threshold degree, the cluster recovery manager 102 can adjust a state of the controller 104 from the second state to the first state.

As a part of the management, the cluster recovery manager 102 can automatically start a recovery of the controller cluster 100 responsive to a determination that at least one of the controller 104 has failed. The automatic recovery of the controller cluster 100 can include reassigning a plurality of portions of APs and/or user devices previously managed by a failed controller periodically to respective standby controllers, and/or restarting the failed controller, as described further herein. As used herein, a plurality of portions of APs and/or user devices refers to a plurality of subsets partitioned from a quantity of APs and/or user devices. Reassigning a plurality of portions of APs and/or user devices periodically to respective standby controllers can include reassigning each portion of the APs and/or user devices to respective controllers over a number of periods. For example, a first portion of APs managed by a failed controller may be reassigned in a first period and a second portion of APs managed by the failed controller may be reassigned in a second period that is different from (e.g., subsequent to) the first period. As used herein, reassigning a plurality of portions of APs and/or user devices periodically to respective standby controllers can be referred to as "periodic reassignment."

FIG. 1A shows an example controller cluster prior to initiating a periodic reassignment. As illustrated in FIG. 1A, the controller 104-1 is determined to have failed. Responsive to the determination of the failure, the cluster recovery manager 102 can start the periodic reassignments by reassigning, during a first period, APs 106-1 and 106-3 to standby controller 104-2 and 104-3, respectively. Reassigning at least one AP(s) that is managed by a failed controller can free up at least a portion of the load imposed on the failed controller, which can result in an increased degree of performance of the failed controller.

Figure 1B:
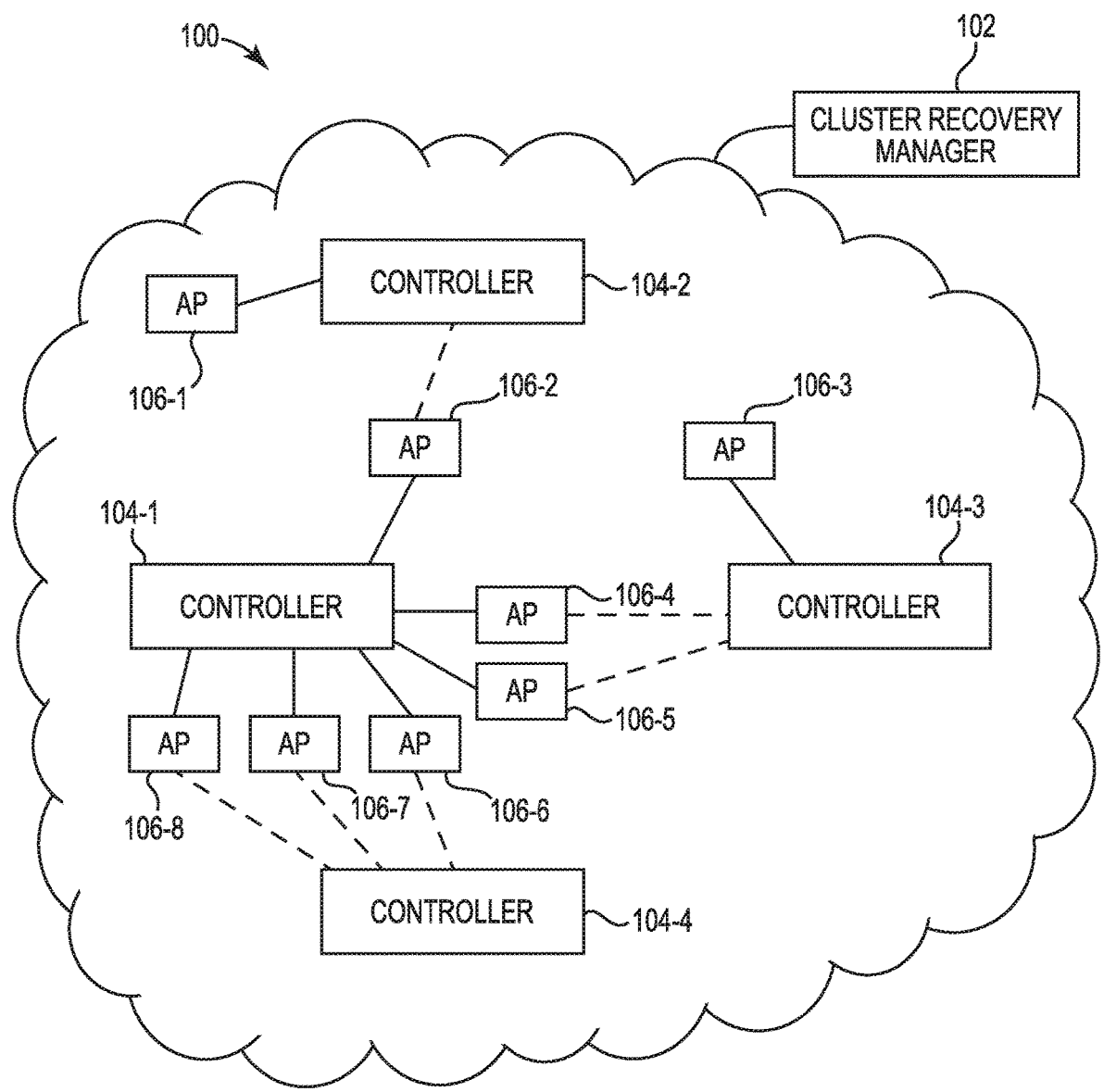

FIG. 1B shows an example controller cluster subsequent to the first period, during which APs 106-1 and 106-3 were reassigned to respective standby controllers 104-2 and 104-3. Accordingly, the controller 104-2, which used to be a standby controller of the AP 106-1, becomes an active controller for the AP 106-1, and the controller 104-3, which used to be a standby controller of the AP 106-3, becomes an active controller for the AP 106-3, as illustrated in FIG. 1B.

In various examples, the cluster recovery manager 102 can make, prior to starting a second iteration of the periodic reassignment, a determination of whether a state of the failed controller 104-1 is adjustable from the second state (e.g., failure) to the first state (e.g., normal). For example, the cluster recovery manager 102 can monitor, based on information collected subsequent to the first period and from the controller 104-1, a degree of performance of the failed controller 104-1 and determine whether the degree of performance meets or exceeded a threshold degree. If the cluster recovery manager 102 determines that the degree of performance meets or exceeded the threshold degree, the cluster recovery manager 102 stops periodic reassignments of a remaining portion of the APs 106 (e.g., APs 106-2, 106-4, 106-5, 106-6, 106-7, and 106-8). Otherwise, the cluster recovery manager 102 can start the second iteration during a second period. For example, the cluster recovery manager 102 can reassign, during the second period, APs 106-4 and 106-6 to standby controllers 104-3 and 104-4, respectively.

Providing, to a controller cluster, a mechanism of determining, based on a monitored degree of performance of a failed controller, whether to continue or stop periodic reassignments can enable the controller cluster (e.g., via a cluster recovery manager 102) an automatic recovery of the failed controller, which would have not been provided by systems that perform recovery manually. For example, in contrast to those systems, in which a controller is left as failed in a cluster once load balancing (e.g., failover) has performed on the controller, various examples of the disclosure provide a mechanism of monitoring a state of a failed controller over periodic reassignments and adjusting the state based on impacts the periodic reassignments can have on the failed controller. Accordingly, the controller cluster may not alert an administrator and/or a user of the failed controller in the event that the automatic recovery mechanism (e.g., periodic reassignments) recovers the failed controller. As described herein, the automatic recovery process may further include periodic reassignments of user devices managed by a failed controller and/or a restart of the failed controller.

Figure 1C:
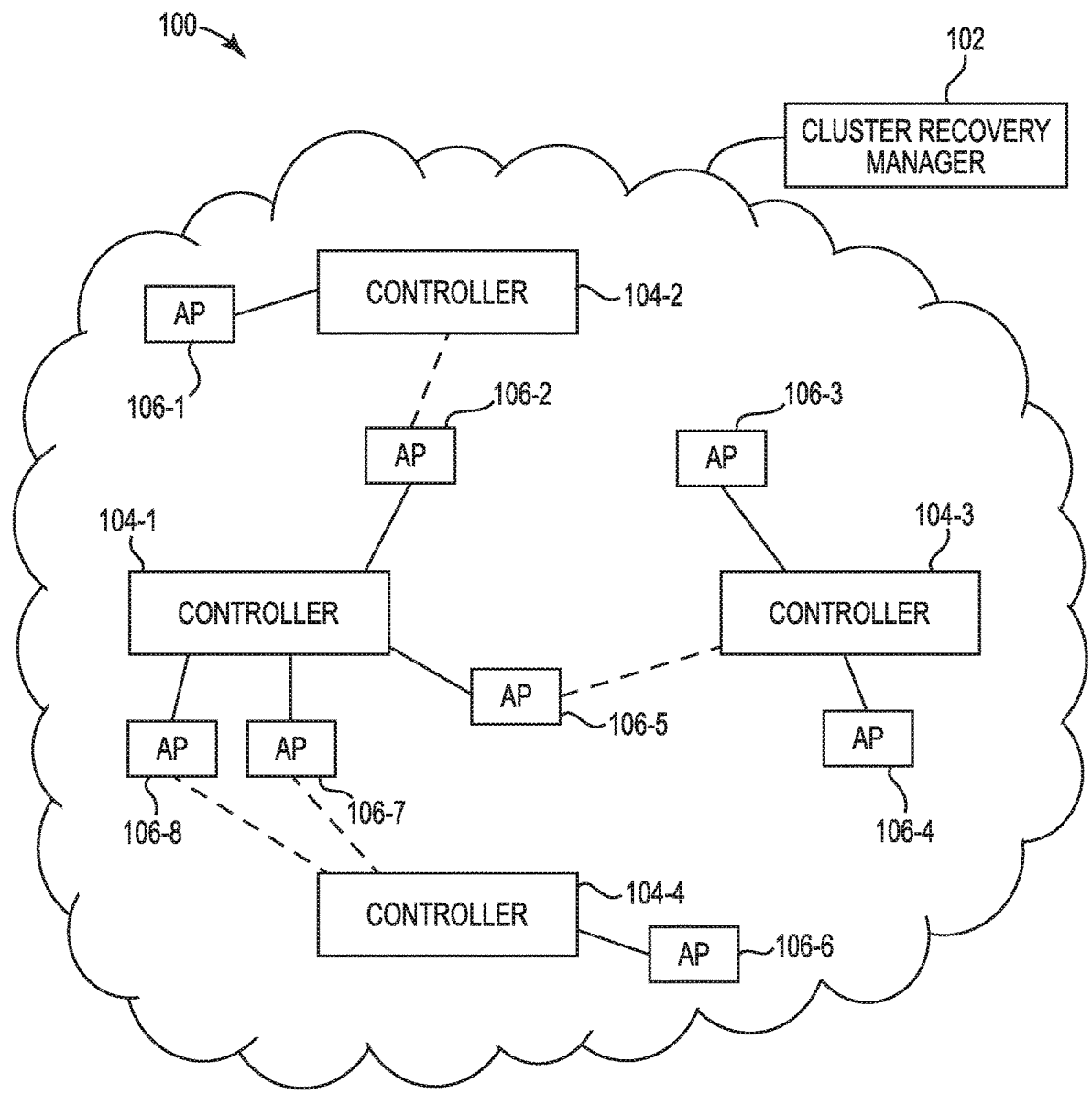

FIG. 1C shows an example controller cluster subsequent to the second period, during which the APs 106-4 and 106-6 were reassigned to respective standby controllers 104-3 and 104-4. Accordingly, the controller 104-3, which used to be a standby controller of the AP 106-4, becomes an active controller for the AP 106-4, and the controller 104-4, which used to be a standby controller of the AP 106-6, becomes an active controller for the AP 106-6, as illustrated in FIG. 1C.

In various examples, the cluster recovery manager 102 can wait for a certain amount of time prior to determining whether to start another periodic reassignment. For example, subsequent to a completion of each iteration of the periodic reassignment, the cluster recovery manager 102 can wait 5 minutes and then determine whether a degree of performance of the controller 104-1 meets or exceeded the threshold degree. Examples are not limited to a particular amount of time the cluster recovery manager 102 waits. For example, the cluster recovery manager 102 can wait shorter or longer than 5 minutes, which may be sufficient to give the controller 104-1 enough time to show an increased degree of performance as a result of the periodic reassignment performed during the first period.

If the determined degree of performance meets or exceeded the threshold degree at that point, the cluster recovery manager 102 can start a third iteration of the periodic reassignment. For example, the cluster recovery manager 102 can, during a third period, reassign the APs 106-2 and 106-7 to controllers 104-2 and 104-4, respectively. If not, the cluster recovery manager 102 can stop the periodic reassignments.

Figure 1D:
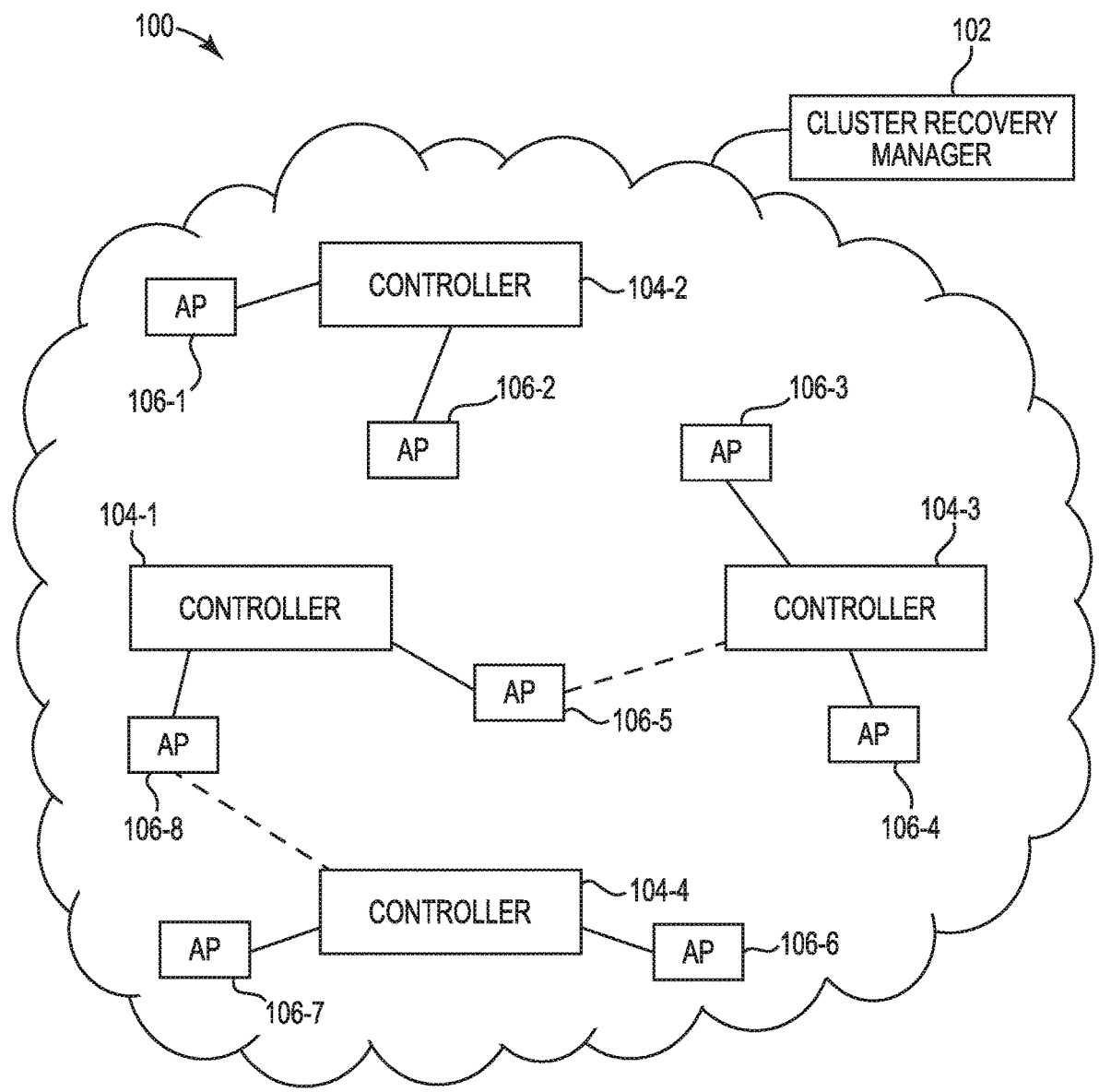

FIG. 1D shows an example controller cluster subsequent to the third period, during which the APs 106-2 and 106-7 were reassigned to respective standby controllers 104-2 and 104-4. Accordingly, the controller 104-2, which used to be a standby controller of the AP 106-2, becomes an active controller for the AP 106-2, and the controller 104-4, which used to be a standby controller of the AP 106-7, becomes an active controller for the AP 106-7, as illustrated in FIG. 1D. Although not shown in FIG. 1D, a controller different than the controller 104-1 can be assigned to the APs 106-2 and 106-7 as a standby controller. If the cluster recovery manager 102 determined, subsequent to the third period, that a degree of performance of the controller 104-1 still does not meet or exceed a threshold degree, the cluster recovery manager 102 can, for example, reassign, during a fourth period the APs 106-5 and 106-8 to controllers 104-3 and 104-4, respectively.

Figure 1E:
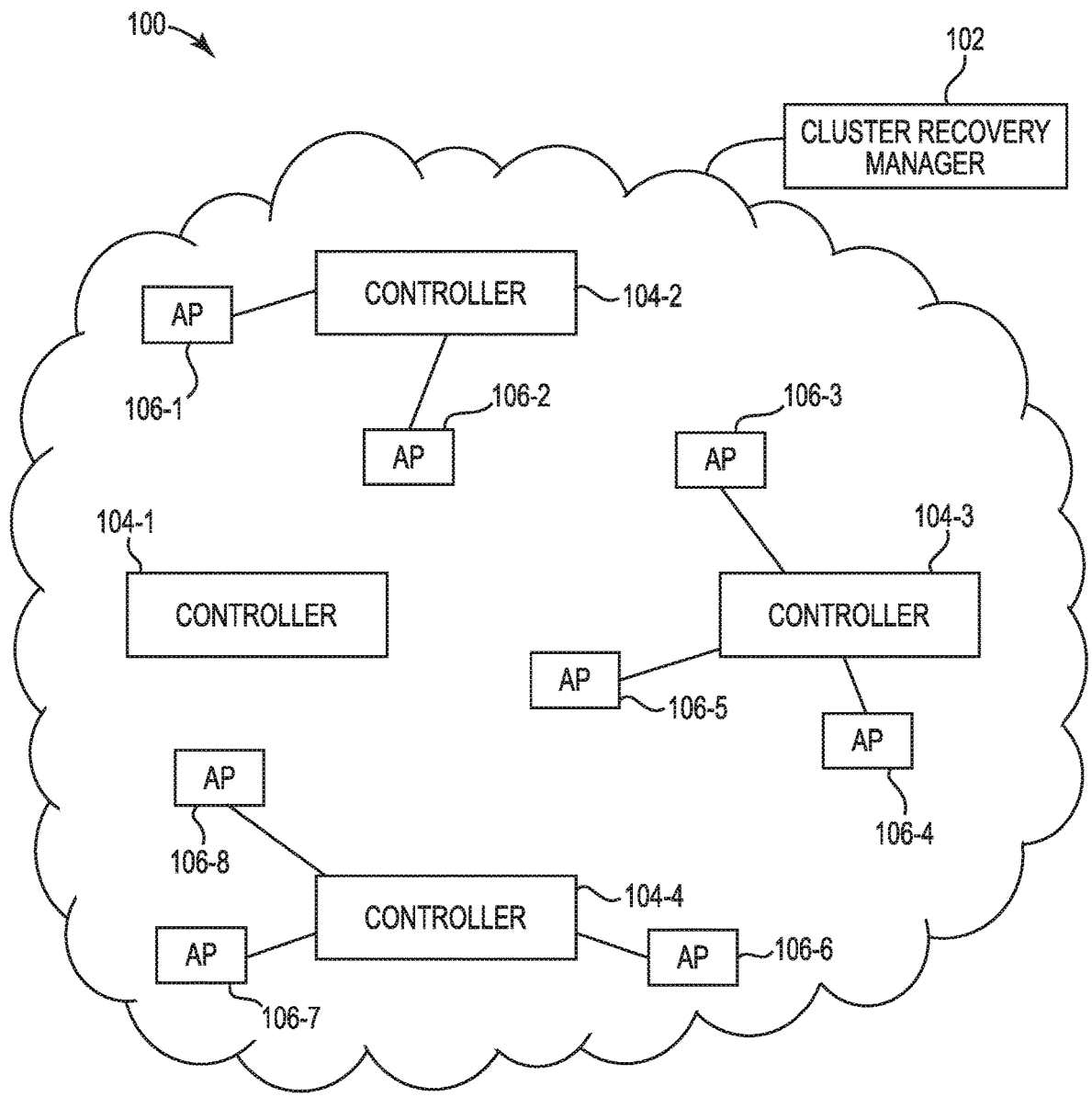

FIG. 1E shows an example controller cluster subsequent to the fourth period, during which the APs 106-5 and 106-8 were reassigned to respective standby controllers 104-3 and 104-4. Accordingly, the controller 104-3, which used to be a standby controller of the AP 106-5, becomes an active controller for the AP 106-5, and the controller 104-4, which used to be a standby controller of the AP 106-8, becomes an active controller for the AP 106-8, as illustrated in FIG. 1E. Although not shown in FIG. 1E, a controller different than the controller 104-1 can be assigned to the APs 106-5 and 106-8 as a standby controller.

As illustrated in FIG. 1A-1E, 25% of APs 106 (e.g., 2 APs out of 8 APs each time) are reassigned in each period. However, examples are not limited to a particular quantity of APs to be reassigned during each period. For example, more or less than 25% can be reassigned in each period and/or a different quantity can be reassigned during each of periods.

As a result of the periodic reassignment over the first, second, third, and fourth periods, all of the APs 106 that were managed by the controller 104-1 is reassigned to respective standby controllers 104-2, 104-3, and 104-4. In various examples, the cluster recovery manager 102 can make, subsequent to the periodic reassignments of all of the APs 106, a determination of whether the controller 104-1 is recovered from a failure or not. In the event that the controller 104-1 is determined to have not recovered from the failure, the cluster recovery manager 102 can start reassigning a corresponding portion of user devices managed by the controller 104-1 periodically to respective standby controllers since there are no more APs to be reassigned off from the controller 104-1. Reassigning user devices from a failed controller is described further in connection with FIG. 2A-2D.

FIGS. 2A-2D illustrate an example management of clusters performed on a controller cluster 200 by a cluster recovery manager 202 consistent with the disclosure. As illustrated in FIG. 2A-2D, the controller cluster can include a cluster recovery manager 202, controllers 204-1, 204-2, 204-3, and 204-4 (collectively referred to as controllers 204) and user devices 207-1, 207-2, 207-3, 207-4, 207-5, and 207-6 (e.g., collectively referred to as user devices 207). The cluster recovery manager 202 and controllers 204 can be analogous to cluster recovery manager 102 and controllers 104, respectively, as described in connection with FIGS. 1A-1E.

The controllers 204 may be UAC. For example, the controller 204 can store state information of respective user devices 207, maintain/track a state of the respective user devices 207, and/or handle a network traffic coming from the respective user devices 207.

The user devices 207 may be connected to respective controllers 204 via various intermediary devices (not shown in FIG. 2A-2D), which can include a different active controller and/or access point (AP). For example, the user devices 207 may be firstly connected to the AP that is connected to a respective one of the controllers 204. As another example, the user devices 207 may be firstly connected to the AP that is connected to an intermediary controller (e.g., active AAC), then connected to the controllers 204 (e.g., active UAC) via the intermediary controller. As used herein, the term "a user device" can refer to a stationary network device (e.g., desktop computer, television, set-up box, video gaming console, etc.) or a mobile network device capable of connecting a plurality of wireless networks. As such, reassigning user devices to respective S-UACs may include transferring state information stored in the active UAC to the respective S-UACs (e.g., such that the transferred state information can be accessed from the respective S-UACs) and/or reassigning the intermediary devices to the respective S-UACs as well. The user device can also be referred to as "client device," etc.

In examples illustrated in FIG. 2A-2D, the controller 204-1 can be an active UAC for the user devices 207 and the controllers 204-2, 204-3, and 204-4 can be standby UACs (S-UAC) for respective user devices 207. For example, the controller 204-2 can be a S-UAC for the user devices 207-1 and 207-4, the controller 204-3 can be a S-UAC for the user devices 207-2 and 207-5, and the controller 204-4 can be a S-UAC for the user devices 207-3 and 207-6. In various examples, at least a portion of the user devices 207 can be reassigned to the S-UACs (e.g., controllers 204-2, 204-3, and/or 204-4) in the event that a degree of performance of the controller 204-1 is determined to be below a threshold degree.

Figure 2A:
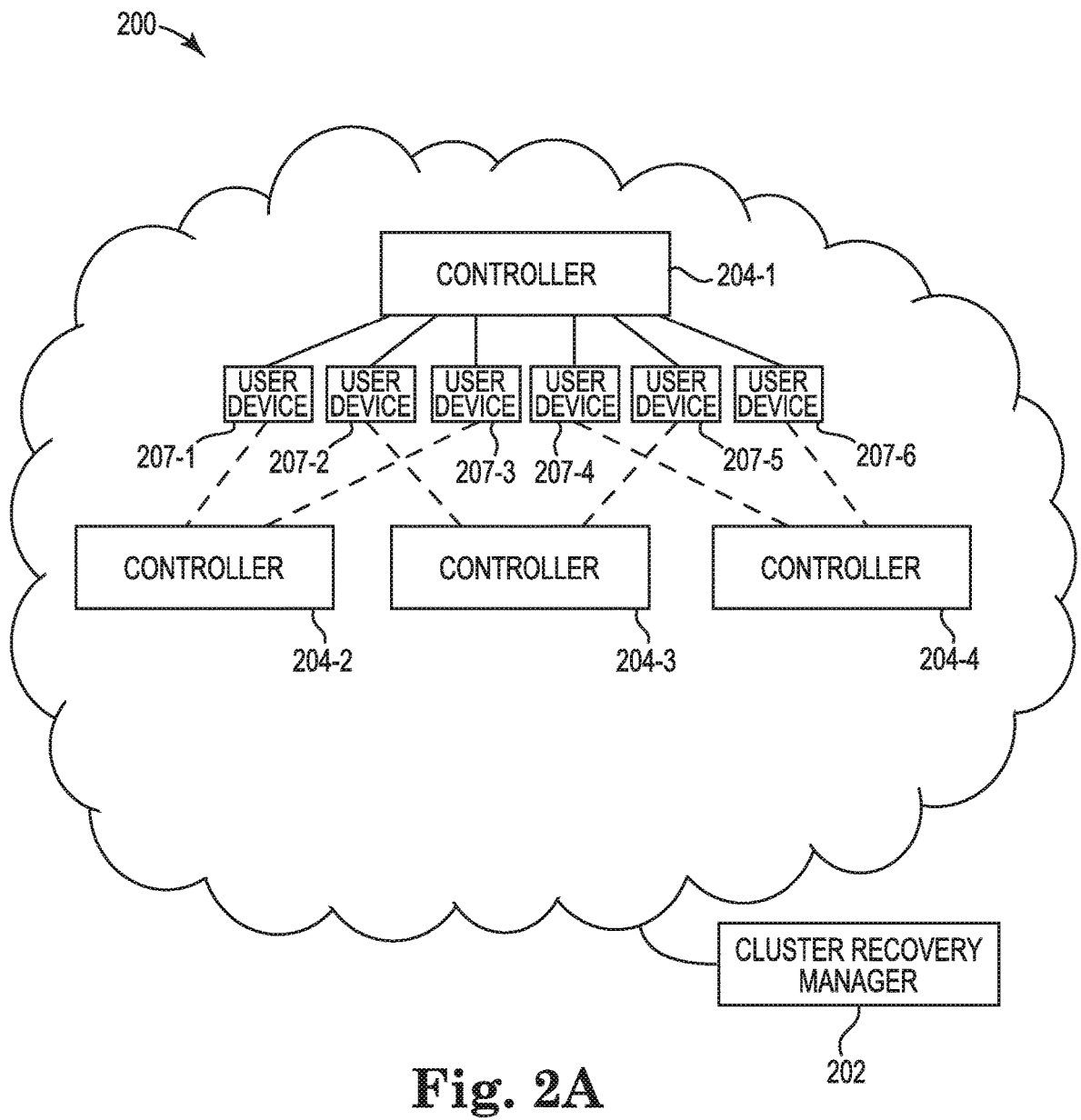
FIGS. 2A-2D illustrate an example management of clusters performed on a controller cluster by a cluster recovery manager consistent with the disclosure.

FIG. 2A shows an example controller cluster prior to initiating periodic reassignments of the user devices 207. As illustrated in FIG. 2A, the controller 204-1 is determined to have failed. Responsive to the determination of the failure, the cluster recovery manager 202 can start a first iteration of the periodic reassignments by reassigning, during a first period, APs 207-1 and 207-2 to S-UACs 204-2 and 204-3, respectively. Reassigning user devices that were managed by a failed controller can free up at least a portion of the load imposed on the failed controller, which can result in an increased degree of performance of the failed controller.

Figure 2B:
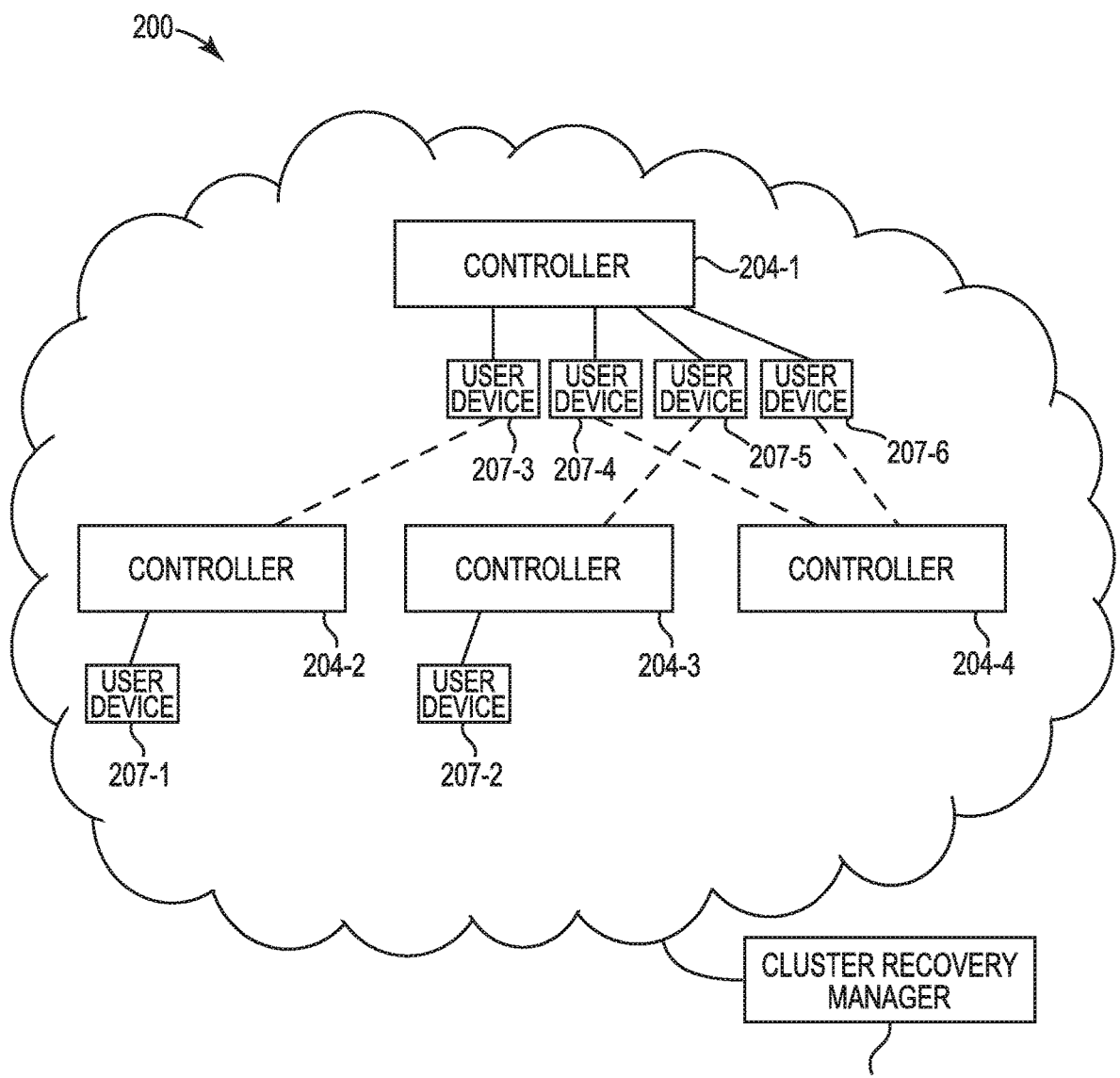

FIG. 2B shows an example controller cluster subsequent to the first period, during which user devices 207-1 and 207-2 were reassigned to respective S-UACs 204-2 and 204-3. Accordingly, the controller 204-2, which used to be a S-UAC of the user device 207-1, becomes an active UAC for the user device 207-1, and the controller 204-3, which used to a S-UAC of the user device 207-2, becomes an active UAC for the user device 207-2. Although not shown in FIG. 2B, the reassigned user devices 207-1 and 207-2 can be assigned a standby controller that may be a controller different than the controller 204-1.

In various examples, the cluster recovery manager 202 can make, prior to starting a second iteration of the periodic reassignment, a determination of whether a state of the controller 204-1 is adjustable from the second state (e.g., failure) to the first state (e.g., normal). For example, the cluster recovery manager 202 can monitor, based on information collected subsequent to the first period and from the controller 204-1, a degree of performance of the failing controller 204-1 and determine whether the degree of performance meets or exceeded a threshold degree. If the cluster recovery manager 202 determines that the degree of performance meets or exceeded the threshold degree, the cluster recovery manager 202 can stop a periodic reassignment of a remaining portion of the user devices (e.g., user devices 207-3, 207-4, 207-5, and 207-6). Otherwise, the cluster recovery manager 202 can start the second iteration of the periodic reassignment of the user devices 207 during a second period. For example, the periodic reassignment performed during the second period can reassign user devices 207-3 and 207-4 to S-UAC 204-2 and 204-4, respectively.

Figure 2C:
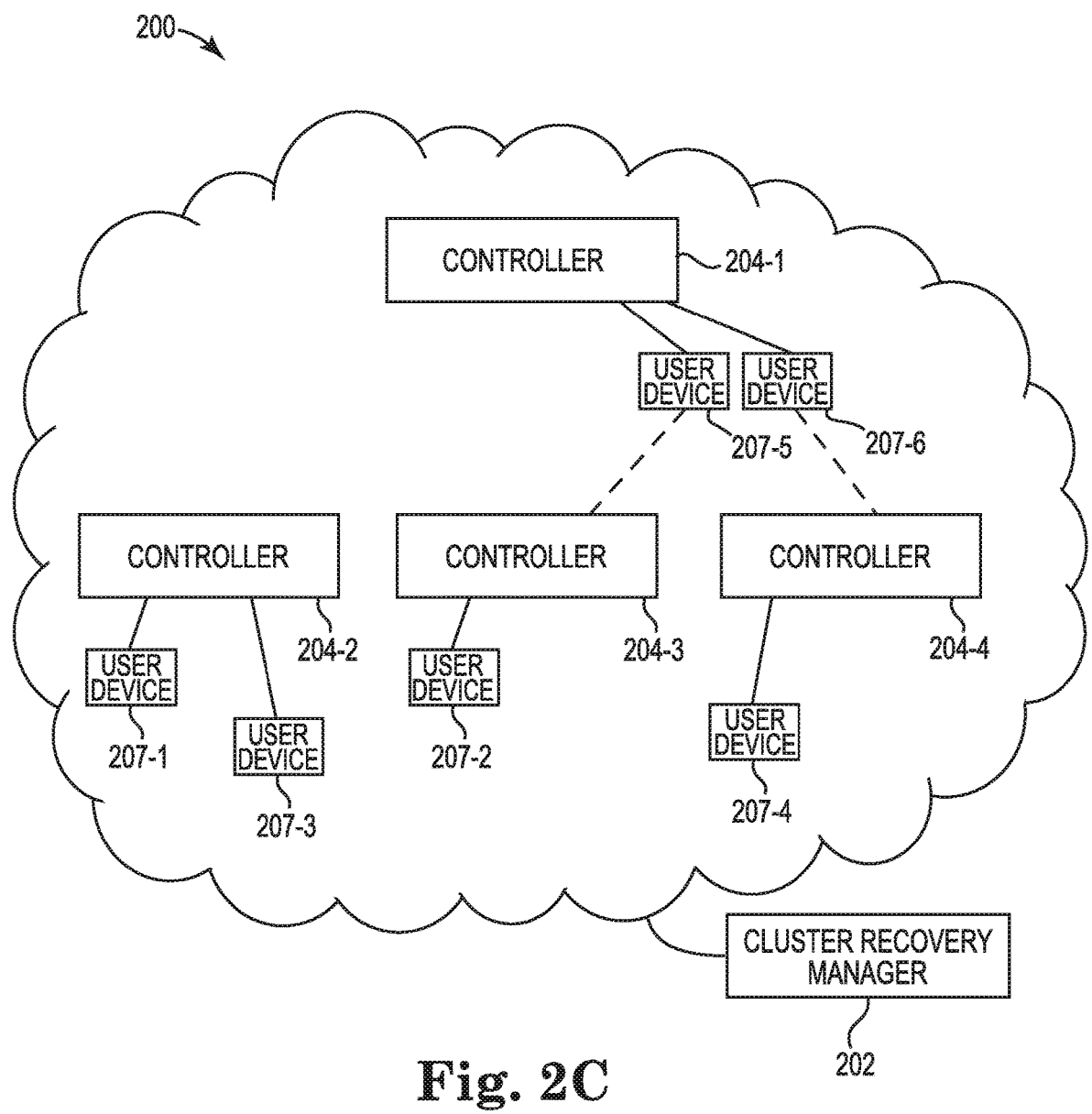

FIG. 2C shows an example controller cluster subsequent to the second period, during which user devices 207-3 and 207-4 were reassigned to respective S-UACs 204-2 and 204-4. Accordingly, the controller 204-4, which used to be a S-UAC of the AP 207-3, becomes an active UAC for the AP 207-3, and the controller 204-2, which used to a S-UAC of the user device 207-4, becomes an active UAC for the user device 207-4. Although not shown in FIG. 2B, the reassigned user devices 207-3 and 207-4 can be assigned a standby controller that may be a controller different than the controller 204-1.

In various examples, the cluster recovery manager 202 can wait for a certain amount of time prior to determining whether to start another iteration of the periodic reassignment. For example, subsequent to a completion of each iteration of the periodic reassignment, the cluster recovery manager 202 can wait 5 minutes and then determine whether a degree of performance of the controller 204-1 meets or exceeded the threshold degree. Examples are not limited to a particular amount of time the cluster recovery manager 202 waits. For example, the cluster recovery manager 202 can wait shorter or longer than 5 minutes that may be sufficient to give the controller 204-1 to show an increased degree of performance as a result of the periodic reassignment performed during the first period.

If the determined degree of performance meets or exceeded the threshold degree at that point, the cluster recovery manager 202 can start a third iteration of the periodic reassignment. For example, the user devices 207-5 and 207-6 can be reassigned, during a third period, to S-UACs 204-3 and 204-4, respectively. If not, the cluster recovery manager 202 can stop the periodic reassignments.

Figure 2D:
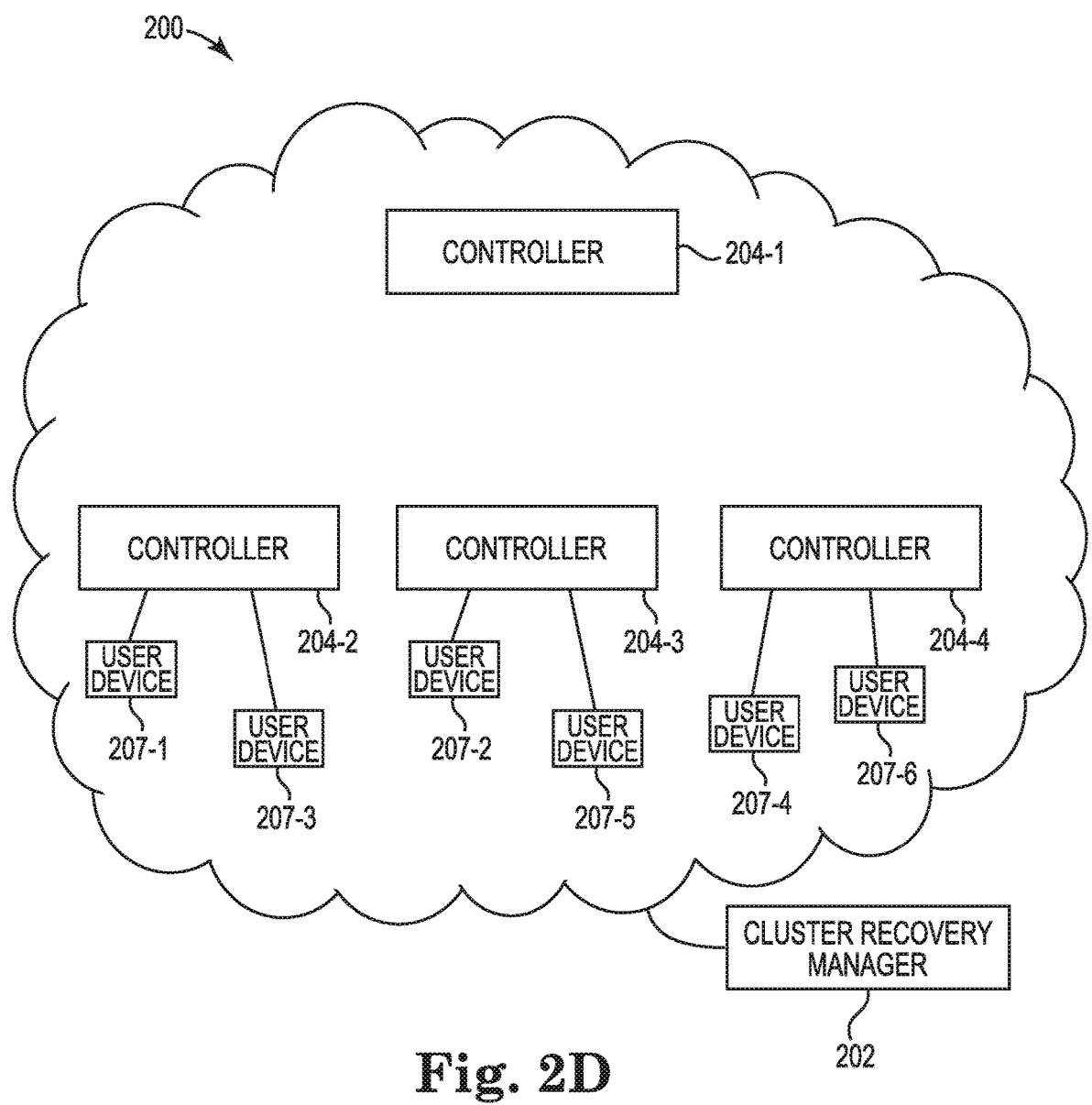

FIG. 2D shows an example controller cluster subsequent to the third period, during which user devices 207-5 and 207-6 were reassigned to respective S-UACs 204-3 and 204-4. Accordingly, the controller 204-3, which used to be a S-UAC of the user device 207-5, becomes an active UAC for the user device 207-5, and the controller 204-4, which used to a S-UAC of the user device 207-6, becomes an active UAC for the AP 207-6. Although not shown in FIG. 2B, the reassigned user devices 207-5 and 207-6 can be assigned a standby controller that may be a controller different than the controller 204-1.

As illustrated in FIG. 2A-2D, about 33% of user devices 207 (e.g., 2 user devices out of 6 user devices each time) are reassigned in each period. However, examples are not so limited to a particular quantity of user devices to be reassigned during each period. For example, more or less than 33% (e.g., 10%) can be reassigned in each period and/or a different quantity can be reassigned during each of periods. In some examples, each of the user devices 207 can be reassigned in an order of session-intensiveness. For example, more session-intense user device can be reassigned prior to less session-intense user device.

As a result of the periodic reassignment over the first, second, and third periods, all of the user devices 207 that were managed by the controller 204-1 is reassigned to respective standby controllers 204-2, 204-3, and 204-4. In various examples, the cluster recovery manager 202 can make, subsequent to the periodic reassignments of all of the user devices 207, a determination of whether the controller 204-1 is recovered from a failure or not. In the event that the controller 204-1 is determined to have not recovered from the failure, the cluster recovery manager 202 can restart the controller 204-1 and determine whether the controller 204-1 is recovered from the failure due to the restart, as described herein.

Figure 3:
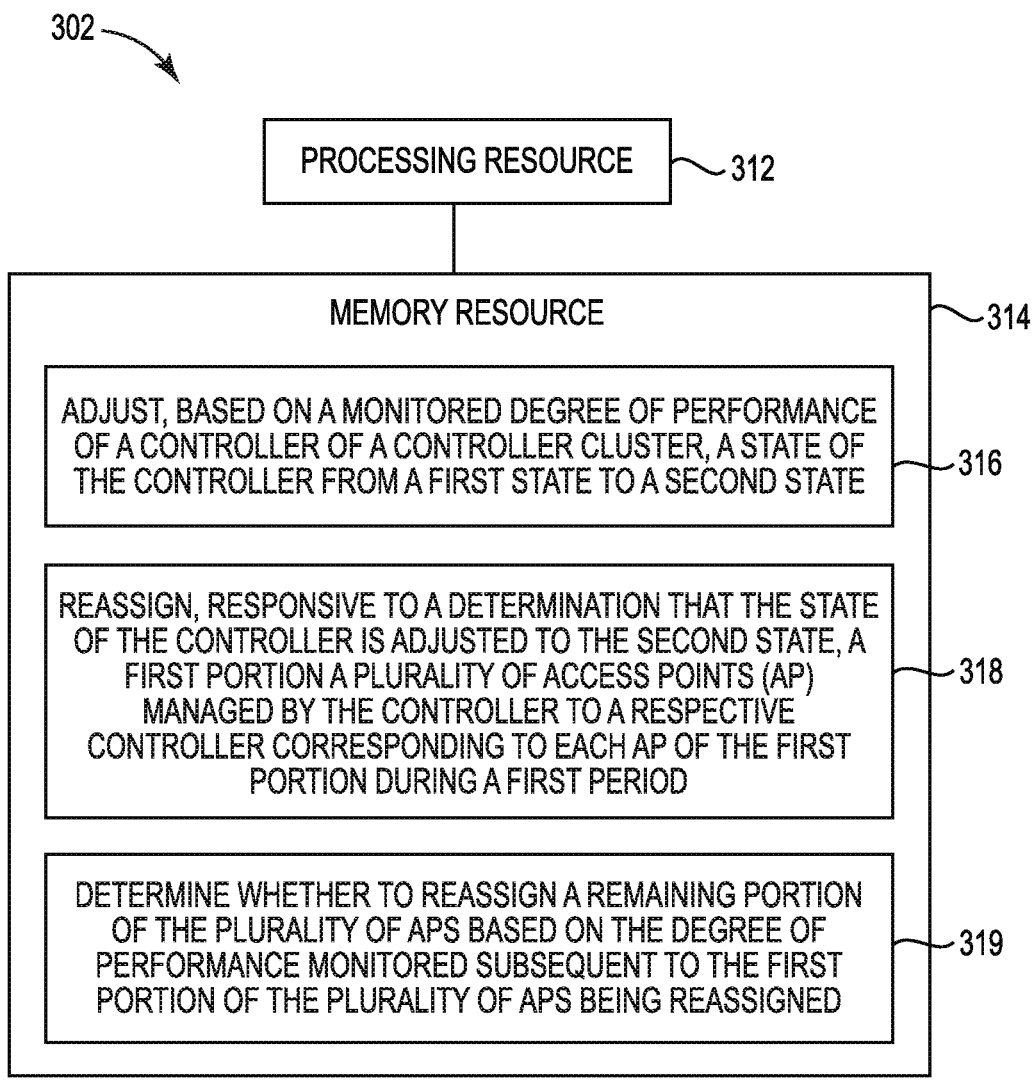
FIG. 3 illustrates an example cluster recovery manager for management of clusters including a processing resource and a memory resource consistent with the present disclosure.

FIG. 3 illustrates an example cluster recovery manager 302 for management of clusters including a processing resource 312 and a memory resource 314 consistent with the present disclosure. Although the following descriptions refer to an individual processing resource and an individual memory resource, the descriptions may also apply to a system with multiple processing resources and multiple memory resources. In such examples, the instructions may be distributed (e.g., stored) across multiple processing resources.

Processing resource 312 may be a CPU, a semiconductor based microprocessor, and/or other hardware devices suitable for retrieval and execution of instructions stored in memory resource 314. Processing resource 322 may fetch, decode, and execute instructions 316, 318, and 319, or a combination thereof. As an alternative or in addition to retrieving and executing instructions, processing resource 312 may include an electronic circuit that includes electronic components for performing the functionality of instructions 316, 318, and 319, or combination thereof.

Memory resource 314 can be volatile or nonvolatile memory. Memory resource 314 can be removable (e.g., portable) memory, or non-removable (e.g., internal) memory. For example, memory resource 314 can be random access memory (RAM) (e.g., dynamic random access memory (DRAM) and/or phase change random access memory (PCRAM)), read-only memory (ROM) (e.g., electronically erasable programmable read-only memory (EEPROM) and/or compact-disk read-only memory (CR-ROM), flash memory, a laser disc, a digital versatile disk (DVD) or other optical disk storage, and/or a magnetic medium such as magnetic cassettes, tapes, or disks, among other types of memory.

Processing resource 312, as used herein, can include a number of processing resources capable of executing instructions stored by a memory resource 314. The instructions (e.g., machine-readable instructions (MRI)) can include instructions stored on the memory resource 314 and executable by the processing resource 312 to implement a desired function (e.g., device identifier classification). The memory resource 314, as used herein, can include a number of memory components capable of storing non-transitory instructions that can be executed by processing resource 312. Memory resource 314 can be integrated in a single device or distributed across multiple devices. Further, memory resource 314 can be fully or partially integrated in the same device as processing resource 312 or it can be separate but accessible to that device and processing resource 312. Thus, it is noted that the edge device 190 can be implemented on an electronic device and/or a collection of electronic devices, among other possibilities.

The memory resource 314 includes instructions 316, 318, and 319. The memory resource 314 can include more or fewer instructions than illustrated to perform the various functions described herein. In some examples, instructions (e.g., software, firmware, etc.) 316, 318, and 319 can be downloaded and stored in memory resource 314 (e.g., MRM) as well as a hard-wired program (e.g., logic), among other possibilities.

Instructions 316, when executed by a processing resource such as processing resource 312, can adjust, based on a monitored degree of performance of a controller of a controller cluster (e.g., controller cluster 100 and 200 as illustrated in FIG. 1 and FIG. 2, respectively), a state of the controller (e.g., controllers 104 and 204 as illustrated in FIG. 1 and FIG. 2, respectively) from a first state to a second state. The monitored degree of performance of the controller can be evaluated based on information collected from the controller such as a load on a CPU of each controller of the controller cluster, a memory consumption on each controller of the controller cluster, frame drops, encryption/decryption failures, global shared memory (GSM) event ring drops, and/or heartbeat message misses, as described in connection with FIG. 1.

In some examples, the first state and the second state can indicate a comparison between the degree of performance of the controller and a threshold degree. For example, the first state can indicate that the degree of performance of the controller is equal to or above the threshold degree, and the second state can indicate that the degree of performance of the controller is below the threshold degree.

Instructions 318, when executed by a processing resource such as processing resource 312, can reassign, responsive to a determination that the state of the controller is adjusted to the second state, a first portion a plurality of access points (AP) managed by the controller to a respective controller corresponding to each AP of the first portion during a first period. The term "respective controller" can refer to standby controller(s) previously assigned to each AP. For example, the term "respective controller" may include a first standby controller previously assigned to a first AP and a second standby controller (e.g., different from the first standby controller) previously assigned to a second AP. Accordingly, the plurality of APs being reassigned to a respective controller can include reassigning the plurality of APs to a plurality of different standby controllers. As described herein, a first portion can be a particular subset partitioned from a quantity of the plurality of APs. The first portion may be a subset that is firstly reassigned from the controller determined to be in the second state.

In some examples, the memory resource 314 can include instructions, when executed by a processing resource such as the processing resource 312, that can determine, based on the degree of performance monitored subsequent to the first portion of the plurality of APs being reassigned, that the state of the controller is still in the second state, and reassign (e.g., responsive to the determination that the controller is still in the second state) a second portion of the plurality of APs to a respective controller corresponding to each AP of the second portion during a second period. Accordingly, the reassignments of the plurality of APs may continue as long as the controller is determined to be in the second state (e.g., failure).

In some examples, the memory resource 314 can include instructions, when executed by a processing resource such as the processing resource 312, that can stop a reassignment of a remaining portion (e.g., other than the first portion) of the plurality of APs responsive to a determination that the state of the controller is adjustable from the second state to the first state. Accordingly, the reassignments of the plurality of APs needs not continue when the controller is determined to be recovered from the failure. As used herein, that the state of the controller is adjustable from the second state to the first state may indicate that the degree of performance of the controller meets or exceeded the threshold degree. Instructions 319, when executed by a processing resource such as processing resource 312, can determine whether to reassign a remaining portion of the plurality of APs based on the degree of performance monitored subsequent to the first portion of the plurality of APs reassigned.

Figure 4:
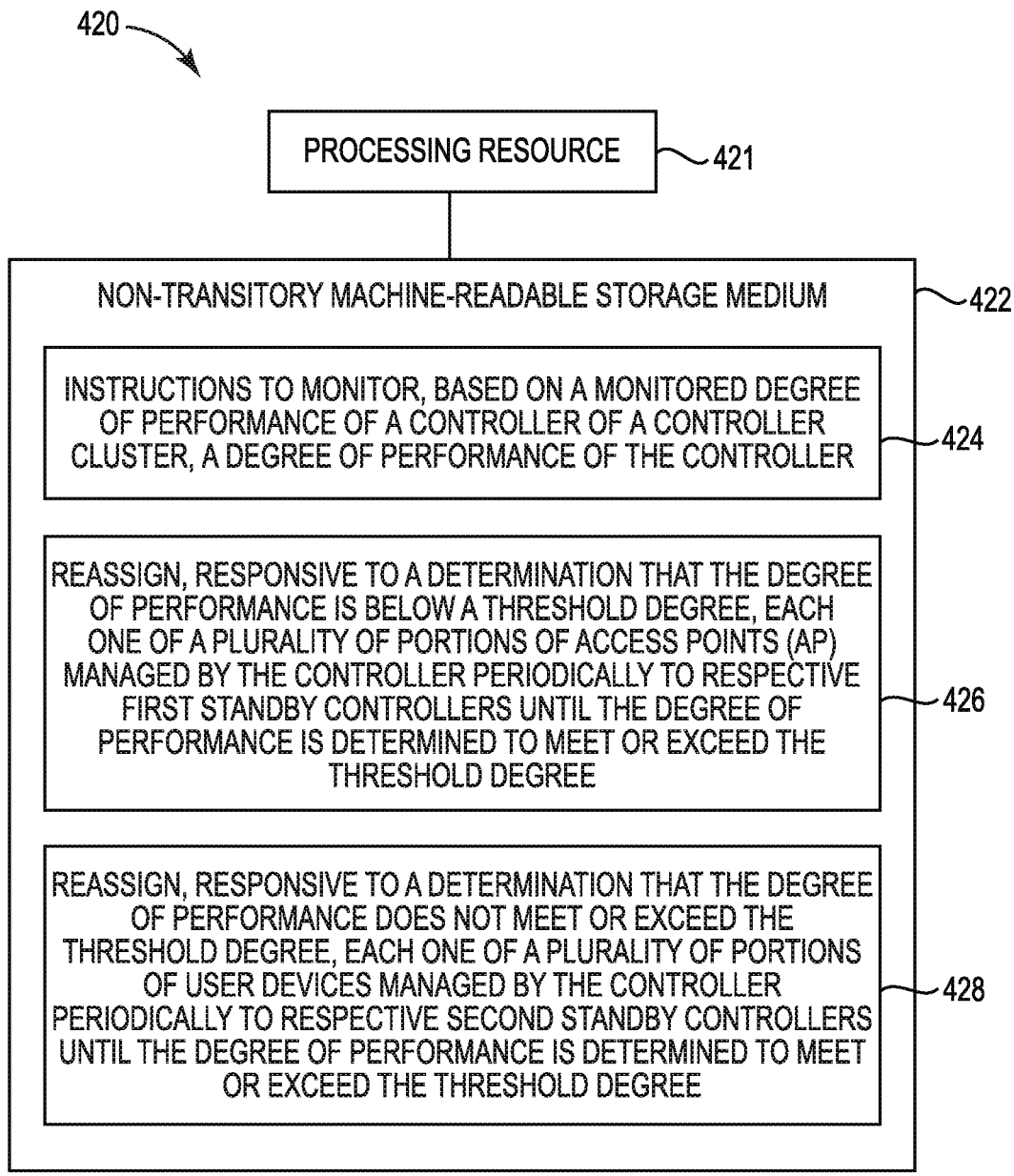
FIG. 4 illustrates an example system for management of clusters including a processing resource and a machine-readable storage medium consistent with the disclosure.

FIG. 4 illustrates an example system 420 for management of clusters including a processing resource 421 and a machine-readable storage medium 422 consistent with the disclosure. In the example of FIG. 4, system 420 includes a processor 421 and a machine-readable storage medium 422. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

The system 420 may include a non-transitory machine readable storage medium 422. Non-transitory machine readable storage medium 422 may be an electronic, magnetic, optical, or other physical storage device that stores executable instructions. Thus, non-transitory machine readable storage medium 422 may be, for example, Random Access Memory (RAM), an Electrically-Erasable Programmable Read-Only Memory (EEPROM), a storage drive, an optical disc, and the like. Non-transitory machine readable storage medium 422 may be disposed within system 420, as shown in FIG. 4. In this example, the executable instructions may be "installed" on the system 420. Additionally and/or alternatively, non-transitory machine readable storage medium 422 may be a portable, external or remote storage medium, for example, that allows system 420 to download the instructions from the portable/external/remote storage medium. In this situation, the executable instructions may be part of an "installation package". As described herein, non-transitory machine readable storage medium 422 may be encoded with executable instructions for a performance threshold.

Instructions 424 may include instructions to monitor, based on information collected from a controller of a controller cluster, a degree of performance of the controller. In some examples, the information collected from the controller may include corresponding values of a plurality of parameters. In this example, the medium 422 may include instructions to compare the corresponding values of the plurality of parameters with respective threshold values, and determined, based on the comparison, whether a particular one of the corresponding values of the plurality of parameters is below a respective threshold value. That the particular one of the corresponding values is below the respective threshold value may indicate that the degree of performance is below the threshold degree. The plurality of parameters may include a load on a CPU of on each controller of the controller cluster, a memory consumption on each controller of the controller cluster, frame drops, encryption/decryption failures, global shared memory (GSM) event ring drops, and/or heartbeat message misses, as described in connection with FIGS. 1A-1E.

Instructions 426 may include instructions to reassign, responsive to a determination that the degree of performance is below a threshold degree, each one of a plurality of portions of access points (AP) managed by the controller periodically to respective first standby controllers until the degree of performance is determined to meet or exceed the threshold degree. As described herein, reassigning each portion of the APs (e.g., each one of the plurality of portions of APs) periodically to respective standby controllers can include reassigning each portion of the APs to the respective standby controllers over a number of periods.

Instructions 428 may include instructions to reassign, responsive to a determination that the degree of performance does not meet or exceed the threshold degree, each one of a plurality of portions of user devices managed by the controller periodically to respective second standby controllers until the degree of performance is determined to meet or exceed the threshold degree. As described herein, reassigning each portion of the user devices (e.g., each one of the plurality of portions of user devices) periodically to respective standby controllers can include reassigning each portion of the user devices to the respective standby controllers over a number of periods. Although examples are not so limited, reassigning the user devices managed by the failed controller periodically to the respective controllers can be initiated (e.g., started) when all of the plurality of APs is reassigned, as a result of the execution of the instructions 424, to respective standby controllers.

In some examples, the medium 422 can include instructions to monitor the degree of performance of the controller subsequent to the reassignment of all of the APs and user devices. When the monitored degree of performance indicates that the controller is still in the second state, the instructions stored in the medium 422 can restart the controller. For example, if a degree of performance of the controller is determined to have not met or exceeded a threshold degree even subsequent to the reassignments of the APs and user devices, the controller can be (e.g., by the cluster recovery manager 102 and/or 202) induced to restart. Subsequent to the restart, a degree of performance of the restarted controller can be determined again, which can be used to determine whether to take further actions, as further described in connection with FIG. 5.

Figure 5:
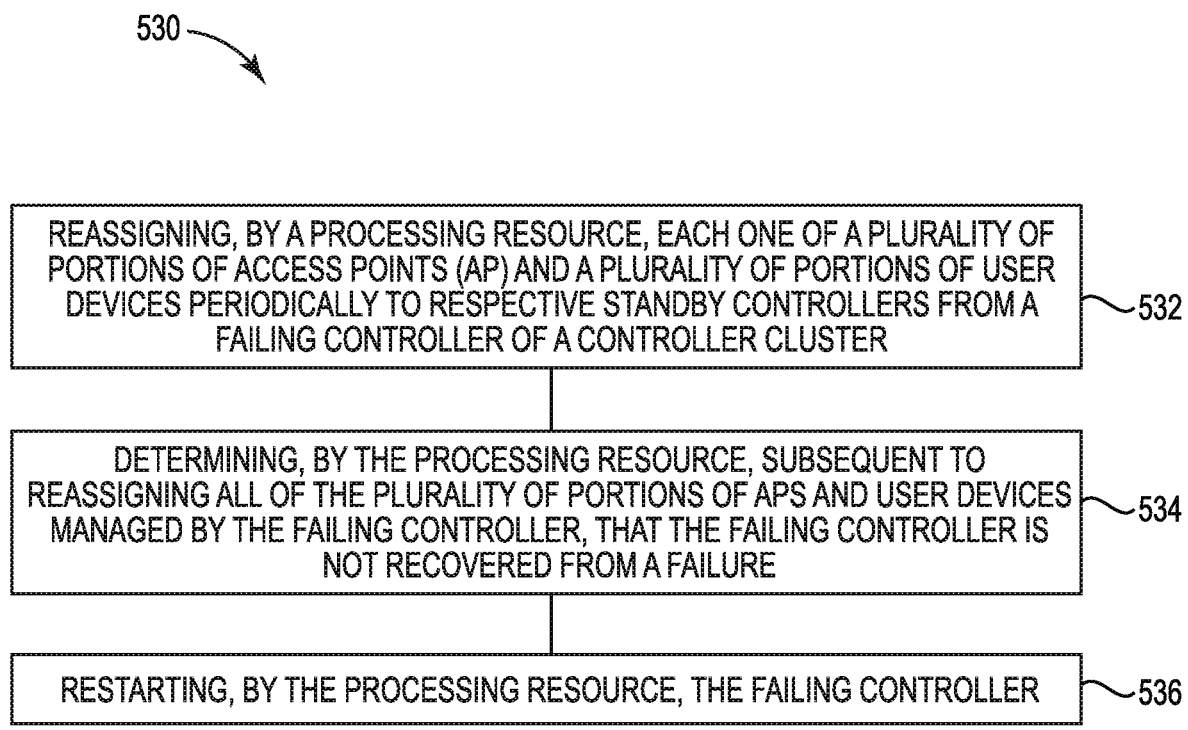
FIG. 5 illustrates an example method consistent with the disclosure.

FIG. 5 illustrates an example method 530 consistent with the disclosure. The method 530 may be performed, for example, by a cluster recovery manager (e.g., cluster recovery manager 102, 202 previously described in connection with FIGS. 1-2, respectively).

At 532, the method 530 may include reassigning, by a processing resource, each one of a plurality of portions of access points (AP) and a plurality of portions of user devices periodically to respective standby controllers from a failing controller of a controller cluster. In some examples, the plurality of portions of APs can be periodically reassigned prior to the plurality of portions of user devices being periodically reassigned, although examples are not so limited. The processing resource may be analogous to the processing resource 312 and/or 421 as described in connection with FIGS. 3 and 4, respectively.

In some examples, the method 530 may include waiting, subsequent to reassigning a first portion of the plurality of portions of APs or the plurality of portions of user devices, a certain amount of time prior to reassigning a second portion of the plurality of portions of APs or the plurality of portions of user devices in a subsequent period. While waiting, a degree of performance of the failing controller can be monitored and determined by the processing resource such that whether to continue periodic reassignments can be determined by the processing resource based on the determined degree of performance.

At 534, the method 530 may include determining, by the processing resource, subsequent to reassigning all of the plurality of portions of APs and user devices managed by the failing controller, that the failing controller is not recovered from a failure. At 536, the method 530 may include restarting, by the processing resource, the failing controller. In some examples, the method 530 can include, responsive to determining that the failing controller is not recovered subsequent to restarting the failing controller, excluding, by the processing resource, the failing controller from the controller cluster. For example, the cluster recovery manager (e.g., cluster recovery manager 102 and/or 202) can wait for a certain amount of time (e.g., 5 minutes) subsequent to restarting the failing controller and exclude the restarted controller from the controller cluster if the restarted controller is determined to be not recovered from a failure. In some examples, the method 530 can include, when the controller is excluded from the controller cluster, alerting, by the processing resource, an administrator that the controller is excluded from the controller cluster.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. A cluster recovery manager, comprising:
   a processing resource; and
   a memory resource storing machine-readable instructions to cause the processing resource to:
      determine a failed controller of a controller cluster;
      responsive to the determination of the faded controller:
         initiate an automatic recovery process of the failed controller that adjusts a slate of the failed controller from a first state to a second state, and
         reassign a first portion of a plurality of access points (APs) managed by the failed controller to a second controller of the controller cluster at a first iteration of a periodic reassignment of the plurality of APs;
         during a second iteration of the periodic reassignment of the plurality of APs that is different than the first iteration, reassign a second portion of the plurality of APs managed by the failed controller to a third controller of the controller cluster, wherein the second portion of the plurality of APs comprise different APs than the first portion; and
         stop the periodic reassignment of the plurality of APs based on the automatic recovery process of the failed controller.

2. The cluster recovery manager of claim 1, wherein the second portion of the plurality of APs is periodically reassignable in a respective period until the state of the failed controller is determined to be adjustable from the second state to the first state.

3. The cluster recovery manager of claim 1, wherein the second state indicates a degree of performance of the failed controller below a threshold degree of performance.

4. The cluster recovery manager of claim 1, wherein stopping the periodic assignment of the plurality of APs is also based on a determination that the state of the failed controller is adjustable from the second state to the first state.

5. The cluster recovery manager of claim 1, wherein the automatic recovery process comprises periodic reassignments of user devices managed by the failed controller.

6. The cluster recovery manager of claim 1, wherein the first state is normal and the second state is failure.

7. The cluster recovery manager of claim 1, wherein the second controller is an access point anchor controller (active AAC) and the third controller is a user anchor controller (UAC).

8. A non-transitory machine-readable storage medium storing instructions executable by a processing resource to:
   determine a failed controller of a controller cluster;
   responsive to the determination of the faded controller:
      initiate an automatic recovery process of the faded controller;
      reassign a first portion of a plurality of access points (APs) managed by the failed controller periodically to first standby controllers of the controller cluster at a first iteration of a periodic reassignment; and
      during a second iteration of the periodic reassignment of the plurality of APs that is different than the first iteration, reassign a second portion of the plurality of APs managed by the failed controller to second standby controllers of the controller cluster, wherein the second portion of the plurality of APs comprise different APs than the first portion; and
      stop the periodic reassignment of the plurality of APs based on the automatic recovery process of the failed controller.

9. The medium of claim 8, wherein determining the failed controller is based on information collected from the failed controller of the controller cluster, and wherein the information includes corresponding values of a plurality of parameters, and the instructions further to:
   compare the plurality of parameters with a plurality of threshold values; and
   determine, based on the comparison, whether a particular one of the plurality of parameters is below one of the plurality of threshold values.

10. The medium of claim 9, wherein the information is collected periodically from the failed controller.

11. The medium of claim 8, the instructions further to:
   collect information associated with all controllers of the controller cluster; and
   monitor respective degree of performances of all controllers of the controller cluster.

12. The medium of claim 8, the instructions further to:
   reassign a plurality of user devices managed by the failed controller, wherein the reassignment of the plurality of user devices is initiated when each of the plurality of APs is reassigned.

13. The medium of claim 8, wherein each one of the first standby controllers is a standby access point anchor controller (S-AAC).

14. The medium of claim 8, wherein each one of the second standby controllers is a standby user anchor controller (S-UAC).

15. The medium of claim 8, wherein the automatic recovery process of the failed controller is to restart the failed controller.

16. A method, comprising:
   determining a faded controller of a controller cluster;
   responsive to the determination of the faded controller:
      initiating an automatic recovery process of the failed controller;
      reassigning, by a processing resource, a first portion of a plurality of access points (APs) managed by the failed controller of the controller cluster to a second controller of the controller cluster at a first iteration of a periodic reassignment of the plurality of APs;

during a second iteration of the periodic reassignment of the plurality of APs that is different than the first iteration, reassigning a second portion of the plurality of APs managed by the failed controller to a third controller of the controller cluster, wherein the second portion of the plurality of APs comprise different APs than the first portion; and stopping the periodic reassignment of the plurality of APs based on the automatic recovery process of the failed controller.

17. The method of claim 16, further comprising:
excluding, by the processing resource, the failed controller from the controller cluster.

18. The method of claim 17, further comprising:
alerting, by the processing resource, an administrator that the failed controller is excluded from the controller cluster.

19. The method of claim 16, wherein the first portion and the second portion of the plurality of APs are periodically reassigned prior to a plurality portions of user devices being periodically reassigned.

20. The method of claim 16, further comprising:
waiting, subsequent to reassigning the first portion of the plurality of APs, a certain amount of time prior to reassigning the second portion of the plurality of APs.

* * * * *